(12) United States Patent
Rahman et al.

(10) Patent No.: US 11,689,570 B2
(45) Date of Patent: Jun. 27, 2023

(54) QUANTUM SECURITY ENHANCEMENT FOR IPSEC PROTOCOL

(71) Applicant: AT&T Intellectual Property I, L.P., Atlanta, GA (US)

(72) Inventors: Moshiur Rahman, Marlboro, NJ (US); William Trost, Mequon, WI (US); Daniel Solero, Rockwall, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 152 days.

(21) Appl. No.: 17/107,846

(22) Filed: Nov. 30, 2020

(65) Prior Publication Data

US 2022/0174095 A1    Jun. 2, 2022

(51) Int. Cl.
*H04L 9/40* (2022.01)
*H04B 10/25* (2013.01)

(52) U.S. Cl.
CPC .......... *H04L 63/164* (2013.01); *H04B 10/25* (2013.01)

(58) Field of Classification Search
CPC ............................ H04L 63/164; H04B 10/25
USPC ........................................................ 713/151
See application file for complete search history.

(56) References Cited

U.S. PATENT DOCUMENTS

| | | | |
|---|---|---|---|
| 7,161,929 B1* | 1/2007 | O'Neill | H04L 45/02 370/349 |
| 9,800,352 B2* | 10/2017 | Frohlich | H04B 10/2581 |
| 2004/0078421 A1* | 4/2004 | Routt | H04L 9/0852 709/201 |
| 2005/0063547 A1* | 3/2005 | Berzanskis | H04L 9/0852 380/278 |
| 2006/0212936 A1* | 9/2006 | Berzanskis | H04L 9/0852 726/14 |
| 2008/0089696 A1* | 4/2008 | Furuta | H04L 9/0855 398/175 |
| 2010/0129073 A1* | 5/2010 | Hamana | H04L 7/0008 398/141 |
| 2022/0269976 A1* | 8/2022 | Wang | H04L 9/0855 |

* cited by examiner

*Primary Examiner* — Michael S McNally
(74) *Attorney, Agent, or Firm* — Hartman & Citrin LLC

(57) ABSTRACT

The concepts and technologies disclosed herein are directed to quantum security enhancement for IPsec protocol. According to one aspect disclosed herein, a quantum resource manager ("Q-RM") can find a recommended quantum routing path for routing data from a first data center to a second data center via a pair of entangled quantum particles. The Q-RM can instruct a first quantum node ("QN") associated with the first data center and a second QN associated with the second data center to establish a quantum channel that facilitates the recommended quantum routing path. The Q-RM can prepare an IPsec encrypted tunnel to carry a qubit associated with the pair of entangled quantum particles from the first data center to the second data center. The Q-RM can find the recommended quantum routing path responsive to an issue detected with the IPsec encrypted tunnel previously established between the first data center and the second data center.

17 Claims, 8 Drawing Sheets

QUANTUM SECURITY ENHANCEMENT FOR IPSEC PROTOCOL

BACKGROUND

Classical or binary computers use bits to perform calculations. Over the past several decades computers have become more powerful and more efficient and can be used to solve a wide range of problems. Some of these problems, however, are so complex that even the most powerful classical computers require long processing times or are incapable of processing altogether. To address these problems, scientists have turned to quantum physics for answers. While binary computers are limited to two possible states for each bit (i.e., 0 or 1), a quantum computer uses quantum bits (also known as qubits) that can be in superposition, or in other words, multiple states simultaneously (i.e., both 0 and 1). As a simplified example, two classical bits can encode information in one of four possible states 00, 01, 10, or 11, but two qubits can encode a superposition of these states simultaneously. When a qubit is measured, the measured value is out of superposition and represented as one of the two classical states.

Quantum computing has many applications. Currently, one of the most viable use cases is in telecommunications in the form of quantum communications. Quantum communication takes advantage of the laws of quantum physics to protect data. More specifically, photons of light transmitting data along optical cables can be in superposition. If a hacker attempts to tamper with the qubits in superposition, the qubits will fall out of superposition and resolve to a classical state of 0 or 1. As a result, the activity of the hacker is easily detected.

IPsec provides security services for IPv4 and IPv6, such as services for access control, connectionless integrity, data origin authentication, detection and rejection of replays, encryption, and traffic flow confidentiality. IPsec provides these services at the IP layer, and as such, offers protection for all protocols that may be carried over IP. These services can be provided through two traffic security mechanisms—the authentication header ("AH") and the encapsulating security payload ("ESP")—which can be used together or separately. IPsec also uses cryptographic key management procedures and protocols.

SUMMARY

Concepts and technologies disclosed herein are directed to quantum security enhancement for IPsec. According to one aspect of the concepts and technologies disclosed herein, a quantum resource manager ("Q-RM") can find a recommended quantum routing path for routing data from a first data center to a second data center via a pair of entangled quantum particles. The Q-RM can instruct a first quantum node ("QN") associated with the first data center and a second QN associated with the second data center to establish a quantum channel that facilitates the recommended quantum routing path. The Q-RM can prepare an IPsec encrypted tunnel to carry a measurement result of an interaction of a qubit of one quantum particle in the pair of entangled quantum particles from the first data center to the second data center.

The Q-RM can find the recommended quantum routing path responsive to an issue detected with the IPsec encrypted tunnel previously established between the first data center and the second data center. For example, the issue might be an IPsec or other tunnel (e.g., cloud) connection failure, security breach, packet blocking (e.g., end point firewall blocking), packet drops, and/or any other IPsec detected security threats. A rule can specify what is considered to be an issue.

The Q-RM can find the recommended quantum routing path in accordance with a rule. The rule can specify that the quantum channel is to be established over a fiber optic network. The rule alternatively can specify that the quantum channel is to be established over a satellite system.

The Q-RM can combine the IPsec encrypted tunnel and the quantum channel at a first endpoint associated with the first data center and a second endpoint associated with the second data center. A quantum communications session, between the first QN at the first endpoint and the second QN at the second endpoint, can be conducted to teleport the data in the pair of entangled quantum particles from the first QN to the second QN. A classical communications session over the IPsec encrypted tunnel, between first endpoint and the second endpoint, can be conducted to send the measurement result from the first endpoint to the second endpoint.

The Q-RM can prepare the IPsec encrypted tunnel to carry the measurement result by instructing the first endpoint to enable a quantum security treatment flag in a quantum security enhanced authentication header for each IPsec packet to be sent to the second endpoint. The quantum security treatment flag can reside in a reserved portion of an IPsec authentication header.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein provide a quantum security enhancement for IPsec protocol. Today, IPsec protocol does not have a way to leverage added security such as quantum security to address and mitigate its drawbacks and limitations. The concepts and technologies disclosed herein address how IPsec can be modified to incorporate quantum technologies to add extra protection and to introduce a mechanism to address current tunnel security shortcomings, such as on-demand routing over a secure channel (implemented via a quantum channel) for specific mission critical traffic (e.g., first responder traffic via FIRSTNET). The concepts and technologies disclosed herein identify how an authentication header ("AH") can be modified to employ a quantum security enhancement. Moreover, the concepts and technologies disclosed herein provide a method of quantum communication (i.e., quantum teleportation) by combining an already-established IPsec tunnel to carry quantum measurements and a quantum channel carrying entangled quantum particles from source to destination.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
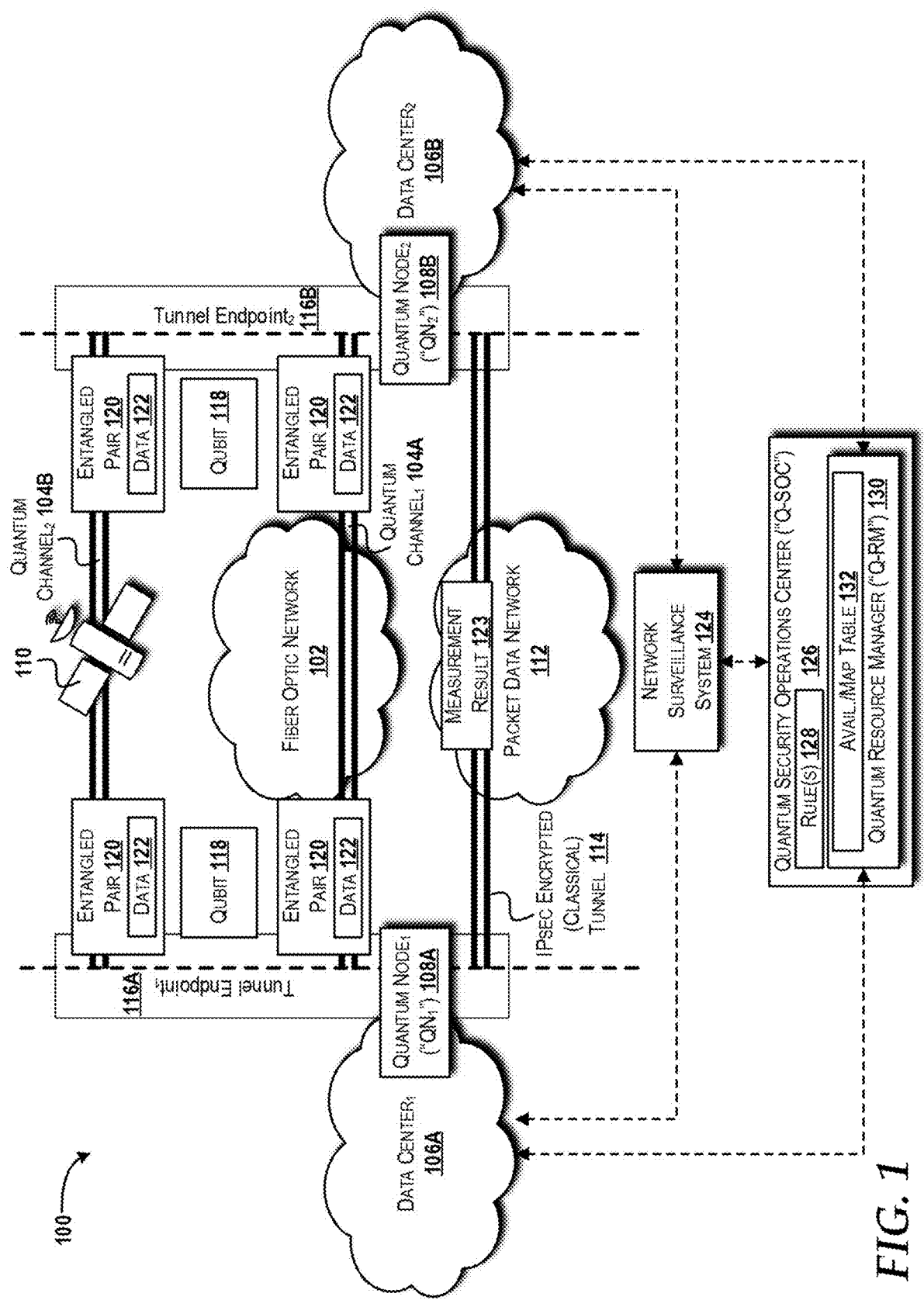
FIG. 1 is a block diagram of an operating environment in which aspects of the concepts and technologies disclosed herein can be implemented, according to an illustrative embodiment.

Turning now to FIG. 1, a block diagram illustrating an operating environment 100 in which aspects of the concepts and technologies disclosed herein can be implemented will be described, according to an illustrative embodiment. The operating environment 100 includes a fiber optic network 102 capable of supporting a first quantum channel ("quantum channel$_1$") 104A for the exchange of data between a first data center ("data center$_1$") 106A and a second data center ("data center$_2$") 106B. It is contemplated that the fiber optic network 102 may support more than one quantum channel 104. More particularly, a first quantum node ("QN$_1$") 108A operating in the data center$_1$ 106A can communicate with a second quantum node ("QN$_2$") 108B operating in the data center$_2$ 106B.

The fiber optic network 102 can use fiber optic cables to transmit data between systems, devices, nodes (e.g., the QN$_1$ 108A and the QN$_2$ 108B), networks, sub-networks, and the like using light as a carrier wave to transmit the data over optical fibers. The fiber optic network 102 can utilize principles of both classical computing and quantum computing to enable both classical and quantum data transmission. The fiber optic network 102 can provide a backhaul network for one or more other network(s), which can be or can include one or more telecommunications networks (e.g., mobile and/or wireline networks), the Internet, one or more circuit-switched networks, one or more packet networks, combinations thereof, and the like. The fiber optic network 102 can include any number of sub-networks (not shown). The sub-networks can vary in the number of wavelengths per fiber pair, data rate supported, and/or optical reachability parameters. The sub-networks can be part of a multi-layer network (not shown), wherein the IP traffic of a packet-layer is carried by the underlying optical layer. The fiber optic network 102 can include any number of regenerators that are used to convert a signal from an optical signal to an electronic signal, to correct any detected errors, and then to convert the signal back to an optical signal with a better optical signal-to-noise ratio. The configuration of the regenerators can be selected based upon the needs of a given implementation. In some embodiments, the fiber optic network 102 can utilize one or more reconfigurable-optical-add-drop multiplexers ("ROADMs"), so that fewer regenerators are needed in the fiber optic network 102. The ROADMs (not shown) can be implemented, at least in part, via a software-defined network ("SDN"; not shown). The ROADMs, in some embodiments, are colorless and directionless, also known as CD-ROADMs. The fiber optic network 102 can be configured in numerous ways to meet the needs of different use cases. As such, additional details about the architecture of the fiber optic network 102 are not disclosed herein. It should be understood, however, that, in addition to traditional hardware-based network architectures, the fiber optic network 102 can be, can include, or can operate in communication with an SDN that is controlled by one or more SDN controllers (also not shown). The fiber optic network 102 can use orthogonal frequency division multiplexing ("OFDM") as the modulation technique. It should be understood, however, that the fiber optic network 102 can use alternative or additional modulation techniques for other optical communications. As such, the fiber optic network 102 is not limited to the use of OFDM as the modulation technique.

The operating environment 100 also includes a satellite system 110 capable of supporting a second quantum channel ("quantum channel$_2$") 104B for the exchange of data between the QN$_1$ 108A operating in the data center$_1$ 106A and the QN$_2$ 108B operating in the data center$_2$ 106B. Embodiments disclosed herein allow for a selection between the quantum channel$_1$ 104A and the quantum channel$_2$ 104B. Practical implementations may use multiple terrestrial quantum channels such as the quantum channel$_1$ 104A operating over the fiber optic network 102 and/or multiple extra-terrestrial quantum channels such as the quantum channel$_2$ 104B. Selection of a terrestrial quantum channel over an extra-terrestrial quantum channel or vice versa may be made based upon availability, preferences, and/or the like as will be described in more detail below.

The operating environment 100 also includes a packet data network 112 (e.g., the Internet, an intranet, IP multimedia subsystem, and/or the like) capable of supporting one or more IPsec encrypted tunnels 114 (also referred to herein as "classical" tunnels to distinguish from quantum tunnels provided by the quantum channels 104). As will be described herein, one of the quantum channels 104 and the IPsec encrypted tunnel 114 can be combined at a first tunnel endpoint ("tunnel endpoint$_1$") 116A, operating as a source, and at a second tunnel endpoint ("tunnel endpoint$_2$") 116B, operating as a destination, to securely exchange information between the data center$_1$ 106A and the data center$_2$ 106B by leveraging both the security services provided by the IPsec protocol and the additional security provided by quantum security.

The quantum channels 104 can be used to teleport a quantum bit ("qubit") 118 via a pair of entangled quantum particles (shown as "entangled pair") 120 from the tunnel endpoint 116A (operating as the source) to the tunnel endpoint 116B (operating as the destination) over the fiber optic network 102 or the satellite system 110 as the case may be. Communication in the reverse direction is also contemplated. The pair of entangled quantum particles 120 contains data 122 to be sent from the QN$_1$ 108A to the QN$_2$ 108B. The classical tunnel 114 can be used to communicate a measurement result 123 of an interaction of the qubit 118 of one of the quantum particles in the pair of entangled quantum particles 120 from the tunnel endpoint 116A (operating as the source) to the tunnel endpoint 116B (operating as the destination) over the packet data network 112.

The data centers 106 can be monitored by a network surveillance system 124 through direct connectivity to the data centers 106 and/or via one or more hardware or software probes (not shown). In some embodiments, the network surveillance system 124 monitors all ingress/egress traffic associated with the data centers 106. In other embodiments, the network surveillance system 124 monitors only IPsec traffic. The network surveillance system 124 also can target certain types of traffic such as mission critical or otherwise high priority traffic such as FirstNet. The network surveillance system 124 can be controlled by a quantum security operation center ("Q-SOC") 126, which can implement one or more rules 128 (alternatively embodied as policies and/or preferences), to instruct the network surveillance system 124 with regard to what traffic should be monitored. For ease of explanation, the rules 128 will be described as specifying IPsec communications, and more particularly, communication or other security issues that might arise during IPsec communications. Moreover, the specificity of the traffic being high priority is also considered. Accordingly, when the network surveillance system 124 determines that traffic, such as the data 122, between the data centers 106 includes IPsec traffic that is deemed high priority (or other rules 128 as the case may be), the network surveillance system 124 can notify the Q-SOC 126. The Q-SOC 126, in turn, can interact with a quantum resource manager ("Q-RM") 130 to take mitigating and recovery action in real-time, such as, for example, rerouting the data 122 over an available quantum channel 104 in accordance with the rule(s) 128. Additional details in this regard will be described herein below with reference to a method 300 shown in FIG. 3. The Q-RM 130 can maintain an availability/map table 132 that details all quantum resources available via the fiber optic network 102 and the satellite system 110. In some embodiments, the availability/map table 132 is regional or market dependent. In other embodiments, the availability/map table 132 is network-wide.

IP Sec provides two security mechanisms that can be used separately or together to provide a secure way to send data over networks. These security mechanisms are authentication header ("AH") and encapsulating security payload ("ESP"). The concepts and technologies disclosed herein leverage the AH, and in particular, a reserved field of the AH to flag packets in order to invoke quantum security treatment. An example quantum security enhanced AH 200 will be described herein below with reference to FIG. 2A.

IPsec uses the AH to digitally sign the entire contents of each packet to be sent over an IPsec tunnel, such as the IPsec encrypted tunnel 114. An example IPsec packet 216 enhanced by quantum security is described herein below with reference to FIG. 2B. This signature provides protection against replay attacks. In a replay attack, an attacker can capture packets, save and modify the packets, and then send the packets to a destination to impersonate a machine/system/device when that machine/system/device is not on the data network. IPsec can prevent replay attacks by including the sender's signature on all packets. IPsec also provides protection against tampering. Since signatures are added to each packet by IPsec, an attacker cannot alter any part of the packet without being detected. IPsec also provides protection against spoofing. Each end of a connection (e.g., client-server) verifies the other's identity with the AH.

Figure 2B:
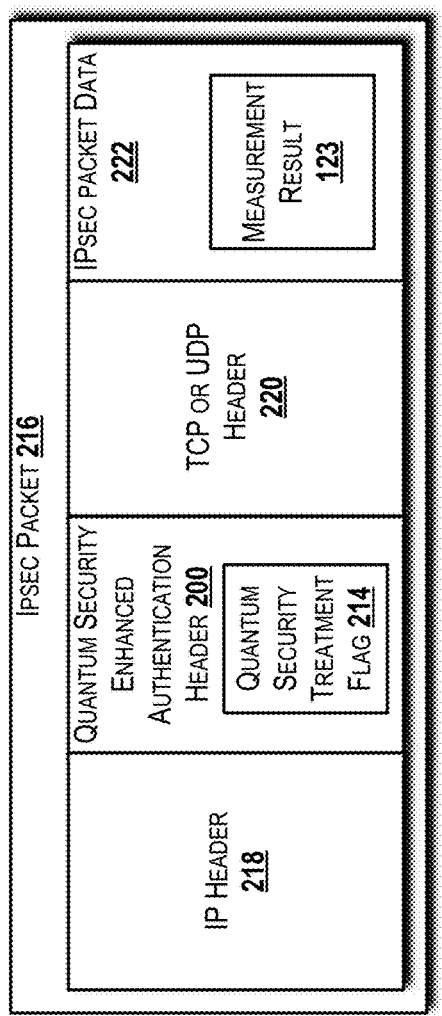
FIG. 2B is a block diagram of a quantum security enhanced IPsec packet, according to an illustrative embodiment of the concepts and technologies disclosed herein.
Figure 2A:
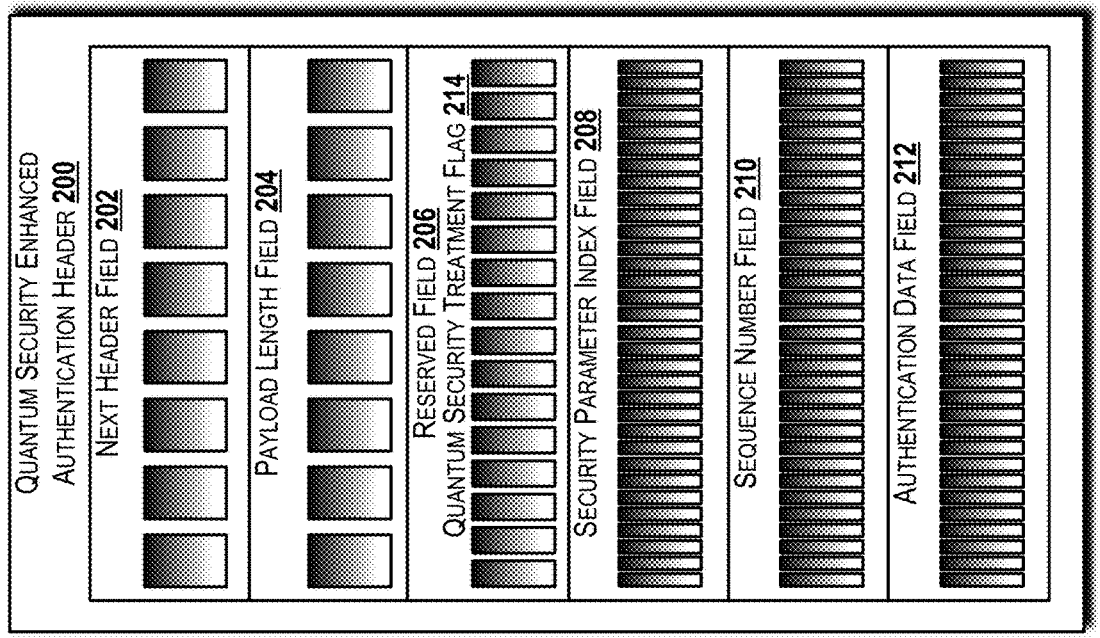
FIG. 2A is a block diagram of a quantum security enhanced authentication header, according to an illustrative embodiment of the concepts and technologies disclosed herein.

Turning now to FIG. 2A, an example quantum security enhanced authentication header ("AH") 200 will be described, according to an illustrative embodiment. The quantum security enhanced AH 200 includes the traditional IPsec AH fields; in particular, a next header field 202, a payload length field 204, a reserved field 206, a security parameter index field 208, a sequence number field 210, and an authentication data field 212. The next header field 202 is an 8-bit field that identifies the type of the next payload after the AH. The payload length field 204 is an 8-bit field that specifies the length of the AH in 32-bit words. The reserved field 206 is a 16-bit field that is currently unused in IPsec. In accordance with the concepts and technologies disclosed herein, the reserved field 206 can be used to flag a packet for quantum security treatment and to invoke quantum security treatment on-demand. In the illustrated example, the reserved field 206 includes a quantum security treatment flag 214 that can use all or a portion of the available bits in the reserved field 206. The security parameter index field 208 is a 32-bit field that contains an arbitrary 32-bit value that, in combination with the destination IP address and the security protocol (AH), uniquely identifies the security association ("SA") for this datagram. The sequence number field 210 is an unsigned 32-bit field that contains a monotonically increasing counter value (sequence number). This field is mandatory in current IPsec and is always present even if the receiver does not elect to enable the anti-replay service for a specific SA. The authentication data field 212 is a variable length field that contains an integrity check value ("ICV") for the associated packet. The authentication data field 212 is currently defined in IPsec as being a multiple of 32 bits in length.

Turning now to FIG. 2B, an example IPsec packet 216 will be described, according to an illustrative embodiment. The IPsec packet 216 includes an IP header 218, the quantum security enhanced AH 200, a transfer control protocol ("TCP") or user datagram protocol ("UDP") header 220, and IPsec packet data 222. The quantum security enhanced AH 200 includes the quantum security treatment flag 216 to invoke quantum treatment for the IPsec packet 216. The data 122 can include the measurement result 123 of an interaction of the qubit 118 of one of the quantum particles in the pair of entangled quantum particles 120 handled by the quantum channel 104A/104B.

Figure 3:
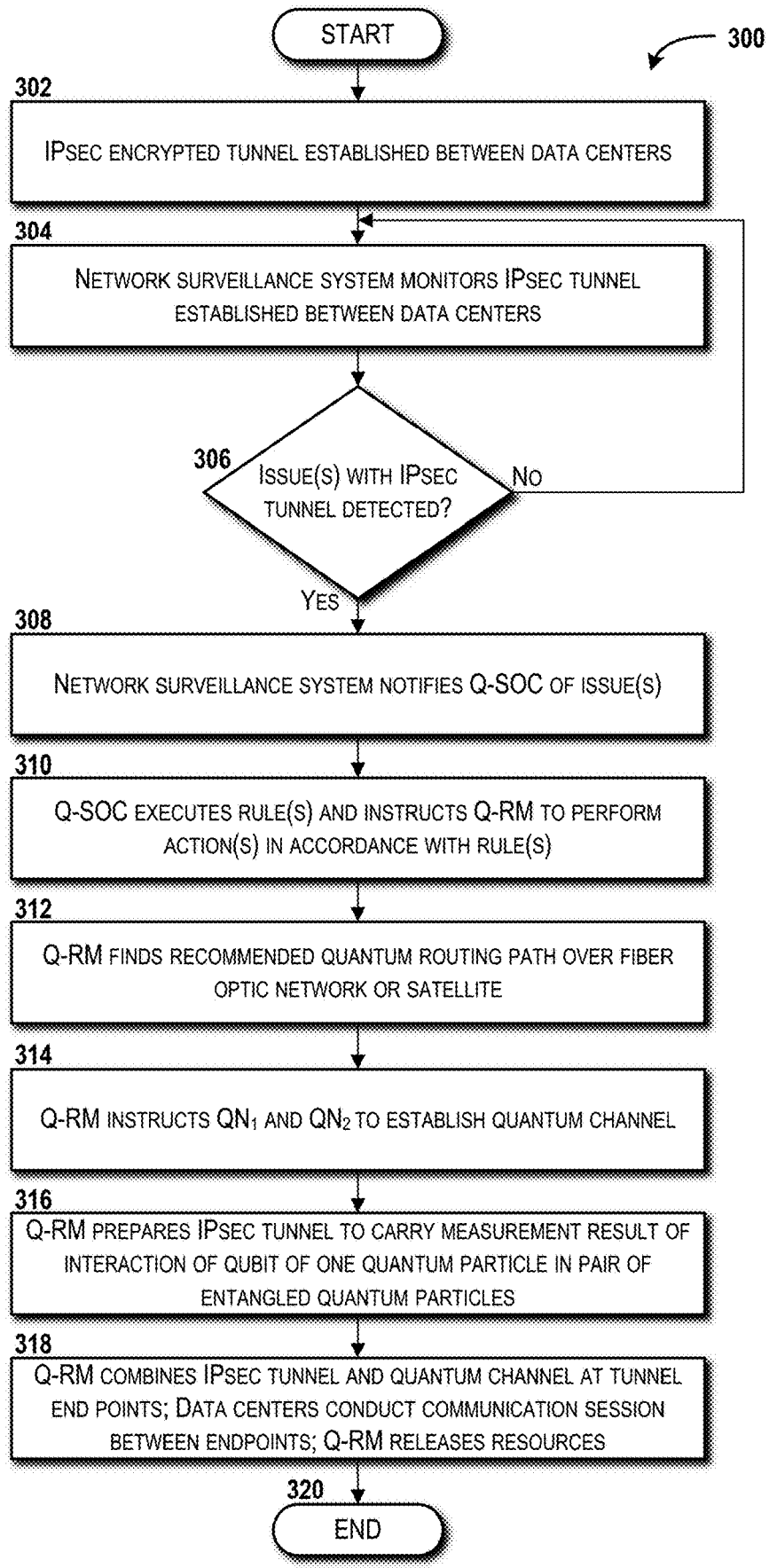
FIG. 3 is a flow diagram illustrating aspects of a method for enhancing IPsec protocol with quantum security, according to an illustrative embodiment of the concepts and technologies disclosed herein.

Turning now to FIG. 3, aspects of a method 300 for enhancing IPsec protocol with quantum security will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or other processing component(s) disclosed herein to perform operations. It should be understood that the performance of one or more operations may include operations executed by one or more virtual processors at the instructions of one or more of the aforementioned hardware processors.

The method 300 begins and proceeds to operation 302. At operation 302, the IPsec encrypted tunnel 114 is established between the data centers 106. Establishment of an IPsec tunnel is well-known, and therefore additional details will not be provided herein. From operation 302, the method 300 proceeds to operation 304. At operation 304, the network surveillance system 124 monitors the IPsec encrypted tunnel 114 that has been established between the data centers 106. As noted above, the network surveillance system 124 can monitor the IPsec encrypted tunnel 114 via direct connectivity to the data centers 106 and/or via the use of one or more hardware or software probes. Moreover, the monitoring can be governed by one or more of the rules 128 established by or for the Q-SOC 126. The rules 128 can include preferences and/or policies to be followed. The rules 128 can specify the condition(s) under which the IPsec encrypted tunnel 114 is considered to have an issue. For example, the issue might be an IPsec or other tunnel (e.g., cloud) connection failure, security breach, packet blocking (e.g., end point firewall blocking), packet drops, and/or any other IPsec detected security threats. From operation 304, the method 300 proceeds to operation 306. At operation 306, the network surveillance system 124 determines if one or more issues with the IPsec encrypted tunnel 114 have been detected. If no issue(s) is/are detected, the method 300 returns to operation 304 and the network surveillance system 124 continues to monitor the IPsec encrypted tunnel 114. If, however, the network surveillance system 124 detects one or more issues, the method 300 proceeds to operation 308.

At operation 308, the network surveillance system 124 notifies the Q-SOC 126 of the issue(s). From operation 308, the method 300 proceeds to operation 310. At operation 310, the Q-SOC executes the rule(s) 128 and instructs the Q-RM 130 to perform one or more actions in accordance with the rule(s) 128. The rule(s) 128 can specify the action(s) to be taken by the Q-RM 130 in response to the issue(s) detected by the network surveillance system 124. The rule(s) 128 can include pre-defined recovery and security mitigation rules/policies to be used to counter the issue.

From operation 310, the method 300 proceeds to operation 312. At operation 312, the Q-RM 130 finds a recommended routing path over the fiber optic network 102 (i.e., the quantum channel$_1$ 104A) or over the satellite system 110 (i.e., the quantum channel$_2$ 104B). In real-world implementations, the Q-RM 130 may have access to other quantum channels 104 facilitated by the fiber optic network 102 and/or the satellite system 110. The Q-RM 130 can use the availability/map table 132 to locate quantum resources. The Q-RM 130 can maintain the availability/map table 132 to ensure that the availability/map table 132 is accurate and up-to-date. The rule(s) 128 may specify a preference of a terrestrial or extra-terrestrial quantum channel. Other preferences specified in the rule(s) 128 can be considered by the Q-RM 130 in performing the operation 312.

From operation 312, the method 300 proceeds to operation 314. At operation 314, the Q-RM 130 instructs the QN$_1$ 108A and the QN$_2$ 108B to establish a quantum channel 104 (i.e., either the quantum channel$_1$ 104A or the quantum channel$_2$ 104B in the example illustrated in FIG. 1) to facilitate the recommended routing path. Also at operation 314, the QN1 108A (operating as the source node) can receive the data 122 from the data center$_1$ 106A and encapsulate it in the pair of entangled quantum particles 120. In some embodiments, the operation 314 can be performed using an existing method, such as super dense coding.

From operation 314, the method 300 proceeds to operation 316. At operation 316, the Q-RM 130 prepares the IPsec encrypted tunnel 114 (already established at operation 302) to carry the measurement result 123 of an interaction of the qubit 118 of one of the quantum particles in the pair of entangled quantum particles 120 from the tunnel endpoint$_1$ 116A at the data center$_1$ 106A to the tunnel endpoint$_2$ 116B at the data centers 106B. More particularly, the Q-RM 130 can instruct the source endpoint (i.e., the tunnel endpoint$_1$ 116A in the example illustrated in FIG. 1) to enable the quantum security treatment flag 214 in the quantum security enhanced authentication header 200 for each of the IPsec packets 216 to be sent to the destination endpoint (i.e., the tunnel endpoint$_2$ 116B in the example illustrated in FIG. 1). In this manner, the source endpoint will add the measurement result 123 to the IPsec packet data 222 and offload the data 122 to the quantum channel 104.

From operation 316, the method 300 proceeds to operation 318. At operation 318, the Q-RM 130 combines the IPsec encrypted tunnel 114 and the quantum channel 104 at the tunnel endpoints 116. The data centers 106 then conduct the quantum communications session over the quantum channel 104 established between the tunnel endpoints 116 and the classical communications session over the IPsec encrypted tunnel 114. After the communications sessions have ended, the Q-RM 130 releases the quantum resources and updates the availability/map table 132 accordingly.

From operation 318, the method 300 proceeds to operation 320. The method 300 can end at operation 320.

Figure 4:
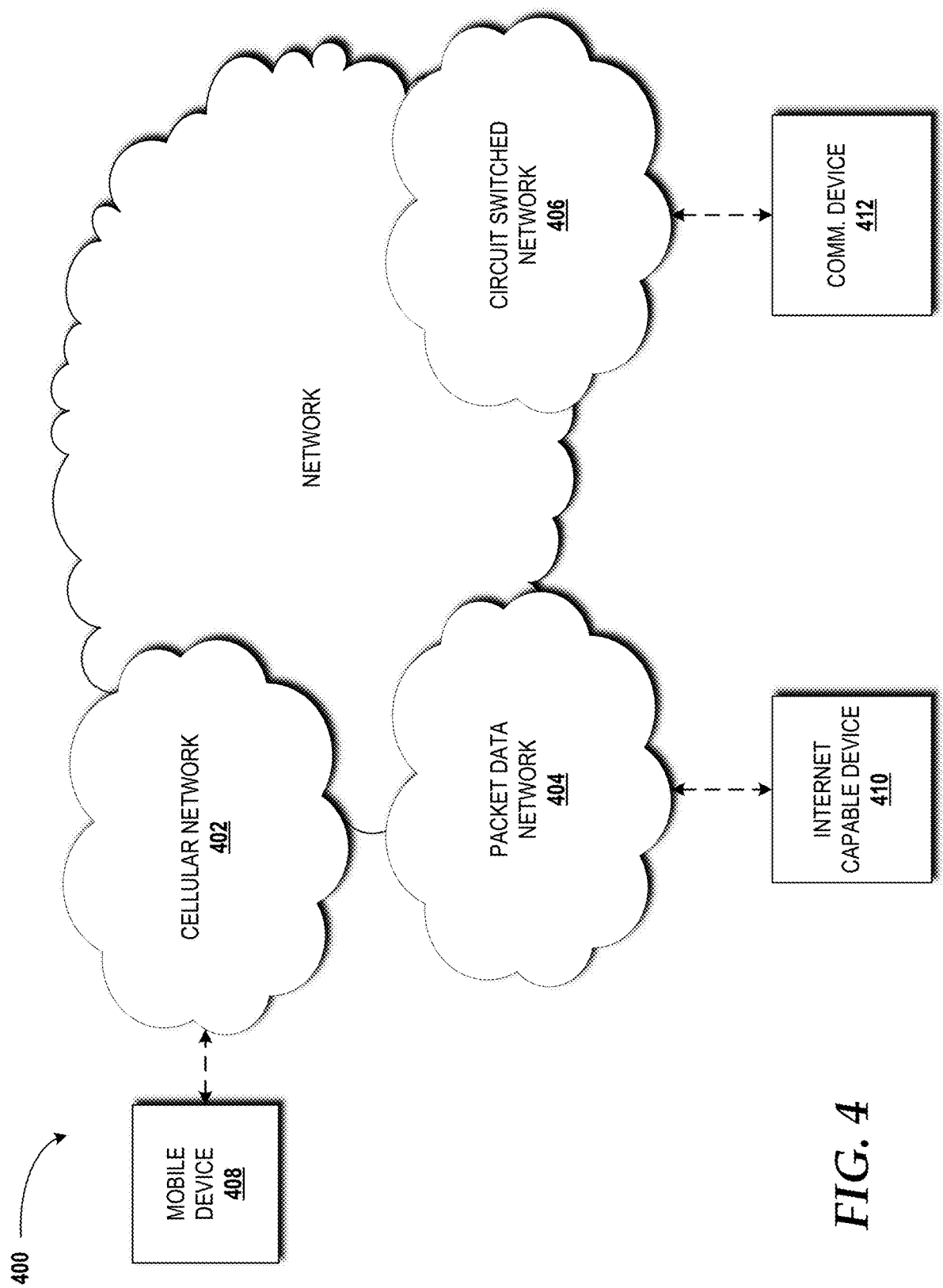
FIG. 4 is a diagram illustrating a network, according to an illustrative embodiment.

Turning now to FIG. 4, details of a network 400 are illustrated, according to an illustrative embodiment. The network 400 includes a cellular network 402, a packet data network 404 such as the packet data network 112 shown in FIG. 1, and a circuit switched network 406, for example, a PSTN. The network 400 can additionally include the fiber optic network 102. For example, the fiber optic network 102 may provide a backhaul/transport network for the cellular network 402.

The cellular network 402 includes various components such as, but not limited to, base transceiver stations ("BTSs"), Node-Bs, eNodeBs, gNodeBs, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, general packet radio service ("GPRS") core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 4G UMTS network and can provide data communications via the HSPA protocol family, for example, HSDPA, EUL (also referred to as HSUPA), and HSPA+. The cellular network 402 also is compatible with 4G mobile communications standards such as LTE, or the like, as well as evolved mobile standards such as 5G and future iterations thereof.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a POTS. The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410.

Figure 5:
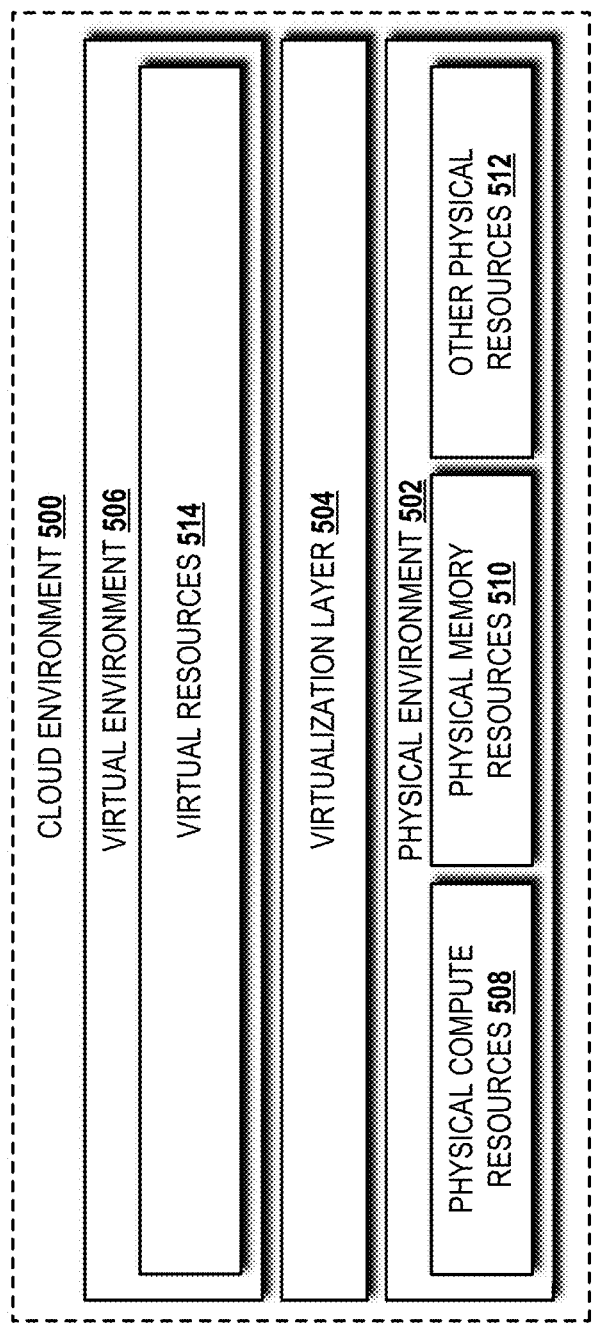
FIG. 5 is a block diagram illustrating an example cloud environment capable of implementing aspects of the embodiments presented herein.

Turning now to FIG. 5, an illustrative cloud environment 500 will be described, according to an illustrative embodiment. In some embodiments, the data centers 106 can utilize, at least in part, an architecture similar to the cloud environment 500. The cloud environment 500 includes a physical environment 502, a virtualization layer 504, and a virtual environment 506. While no connections are shown in FIG. 5, it should be understood that some, none, or all of the components illustrated in FIG. 5 can be configured to interact with one other to carry out various functions described herein. In some embodiments, the components are arranged so as to communicate via one or more networks, such as the network 400, the fiber optic network 102, the packet data network 112, and/or network(s) associated with the data centers 106. Thus, it should be understood that FIG. 5 and the remaining description are intended to provide a general understanding of a suitable environment in which various aspects of the embodiments described herein can be implemented, and should not be construed as being limiting in any way.

The physical environment 502 provides hardware resources, which, in the illustrated embodiment, include one or more physical compute resources 508, one or more physical memory resources 510, and one or more other physical resources 512. The physical compute resource(s) 508 can include one or more hardware components that perform computations to process data and/or to execute computer-executable instructions of one or more application programs, one or more operating systems, and/or other software.

The physical compute resources 508 can include one or more central processing units ("CPUs") configured with one or more processing cores. The physical compute resources 508 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 508 can include one or more discrete GPUs. In some other embodiments, the physical compute resources 508 can include CPU and GPU components that are configured in accordance with a co-processing CPU/GPU computing model, wherein the sequential part of an application executes on the CPU and the computationally-intensive part is accelerated by the GPU processing capabilities. The physical compute resources 508 can include one or more system-on-chip ("SoC") components along with one or more other components, including, for example, one or more of the physical memory resources 510, and/or one or more of the other physical resources 512. In some embodiments, the physical compute resources 508 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 508 can be or can include one or more hardware components architected in accordance with an ARM architecture, available for license from ARM HOLDINGS of Cambridge, United Kingdom. Alternatively, the physical compute resources 508 can be or can include one or more hardware components architected in accordance with an x86 architecture, such an architecture available from INTEL CORPORATION of Mountain View, Calif., and others. Those skilled in the art will appreciate the implementation of the physical compute resources 508 can utilize various computation architectures, and as such, the physical compute resources 508 should not be construed as being limited to any particular computation architecture or combination of computation architectures, including those explicitly disclosed herein.

The physical memory resource(s) 510 can include one or more hardware components that perform storage/memory operations, including temporary or permanent storage operations. In some embodiments, the physical memory resource(s) 510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 508.

The other physical resource(s) 512 can include any other hardware resources that can be utilized by the physical compute resources(s) 508 and/or the physical memory resource(s) 510 to perform operations described herein. The other physical resource(s) 512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 502 can be virtualized by one or more virtual machine monitors (not shown; also known as "hypervisors") operating within the virtualization/control layer 504 to create virtual resources 514 that reside in the virtual environment 506. The virtual machine monitors can be or can include software, firmware, and/or hardware that alone or in combination with other software, firmware, and/or hardware, creates and manages virtual resources operating within the virtual environment 506.

The virtual resources 514 operating within the virtual environment 506 can include abstractions of at least a portion of the physical compute resources 508, the physical memory resources 510, and/or the other physical resources 512, or any combination thereof. In some embodiments, the abstractions can include one or more virtual machines upon which one or more applications can be executed.

Figure 6:
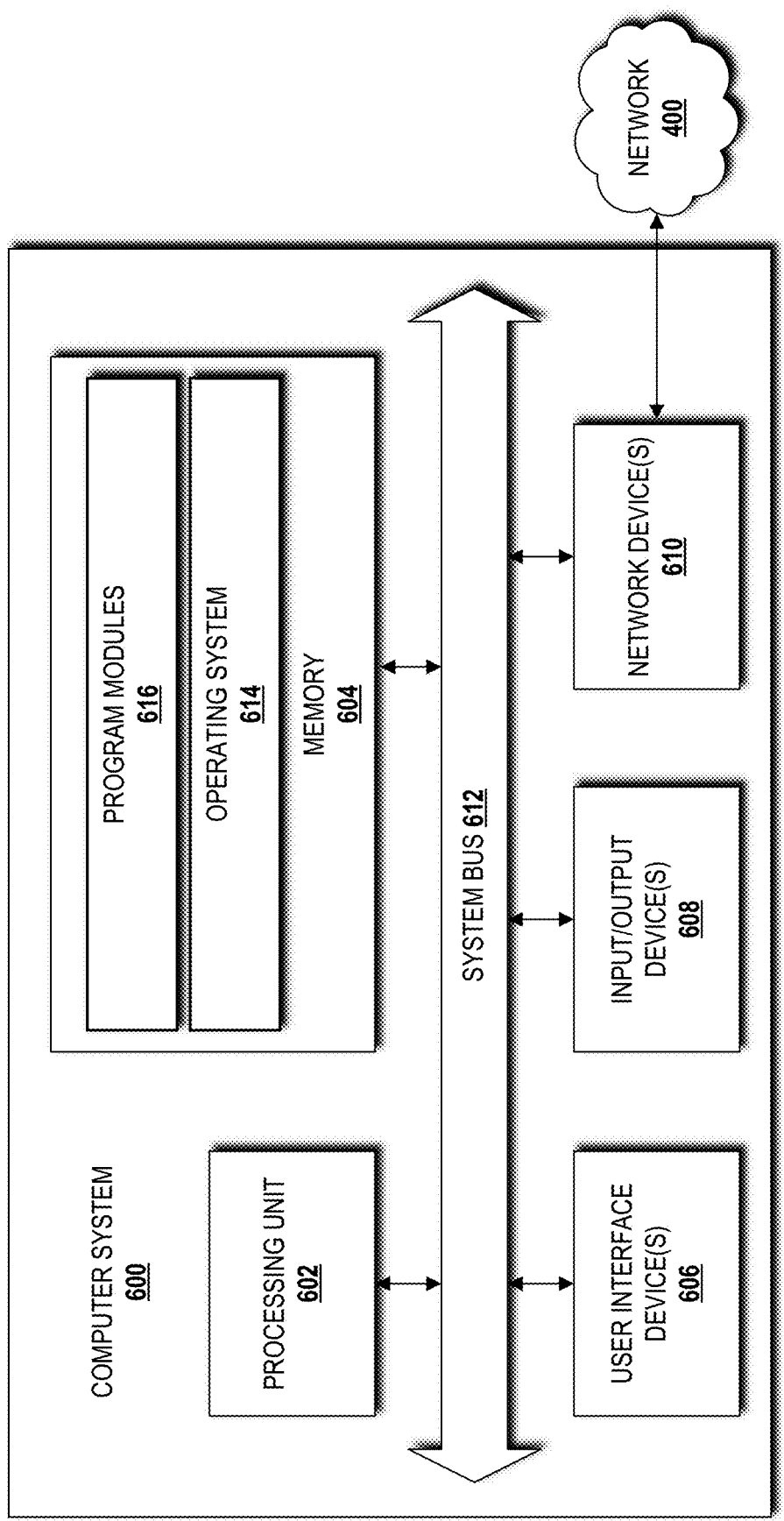
FIG. 6 is a block diagram illustrating an example computer system capable of implementing aspects of the embodiments presented herein.

FIG. 6 is a block diagram illustrating a computer system 600 configured to provide the functionality in accordance with various embodiments of the concepts and technologies disclosed herein. In some embodiments, one or more systems operating as part of the data centers 106, the network surveillance system 124, the Q-SOC 126, the Q-RM 130, and/or other systems and devices described herein can be configured, at least in part, like the architecture of the computer system 600. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium," "computer-readable storage medium," and variations thereof does not include waves or signals per se and/or communication media, and therefore should be construed as being directed to "non-transitory" media only.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 400, which can be or can include the fiber optic network 102 and/or the packet data network 112. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be a wired network such as, but not limited to, a Wide Area Network ("WAN"), a wired Personal Area Network ("PAN"), or a wired Metropolitan Area Network ("MAN"). The network 618 may be any other network described herein.

Figure 7:
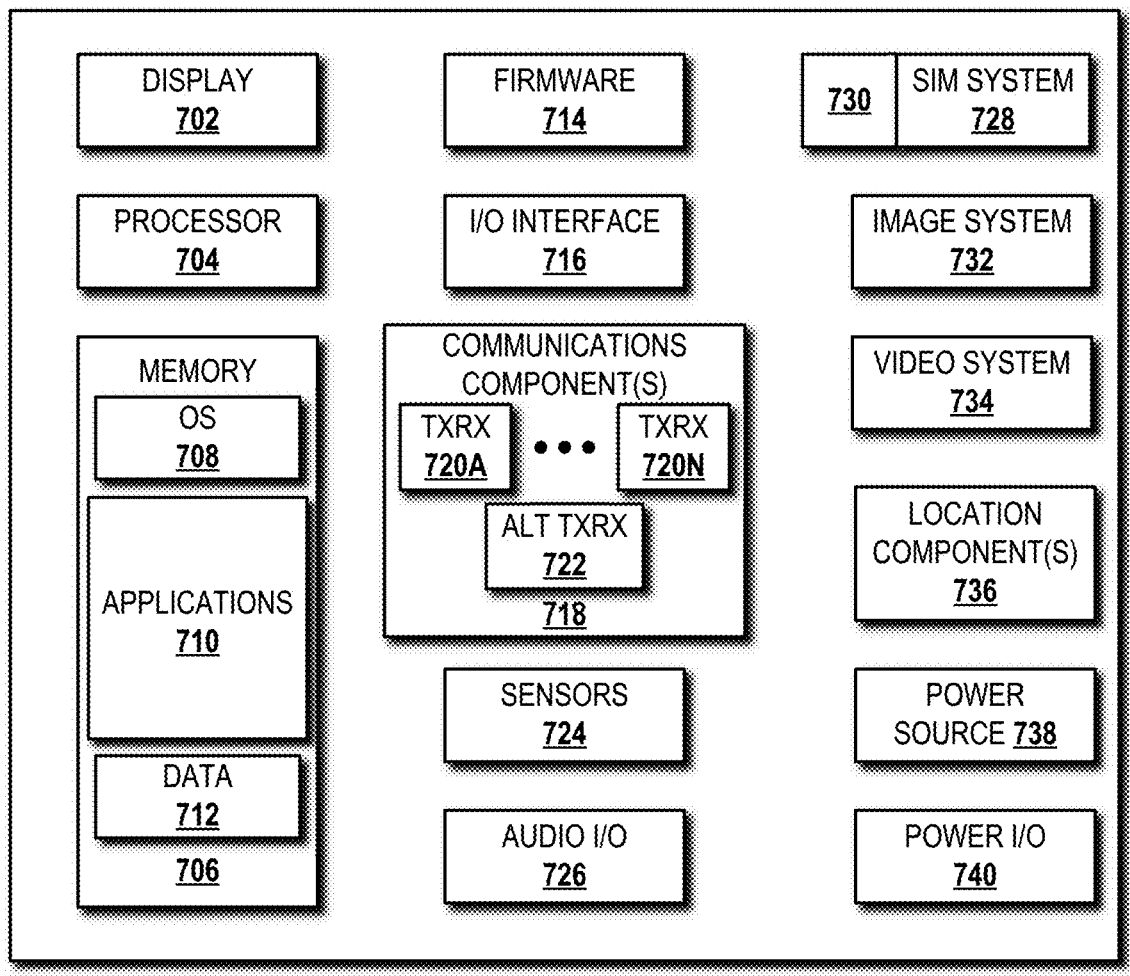
FIG. 7 is a block diagram illustrating an example mobile device capable of implementing aspects of the embodiments disclosed herein.

Turning now to FIG. 7, an illustrative mobile device 700 and components thereof will be described. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various GUI elements, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in a memory 706, or the like. In some embodiments, the applications 710 also can include a user interface ("UI") application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. According to various embodiments, the data 712 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMA ONE, CDMA2000, LTE, and various other 2G, 2.5G, 4G, 4G, 5G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-720N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broad-band provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from GPS devices, assisted GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
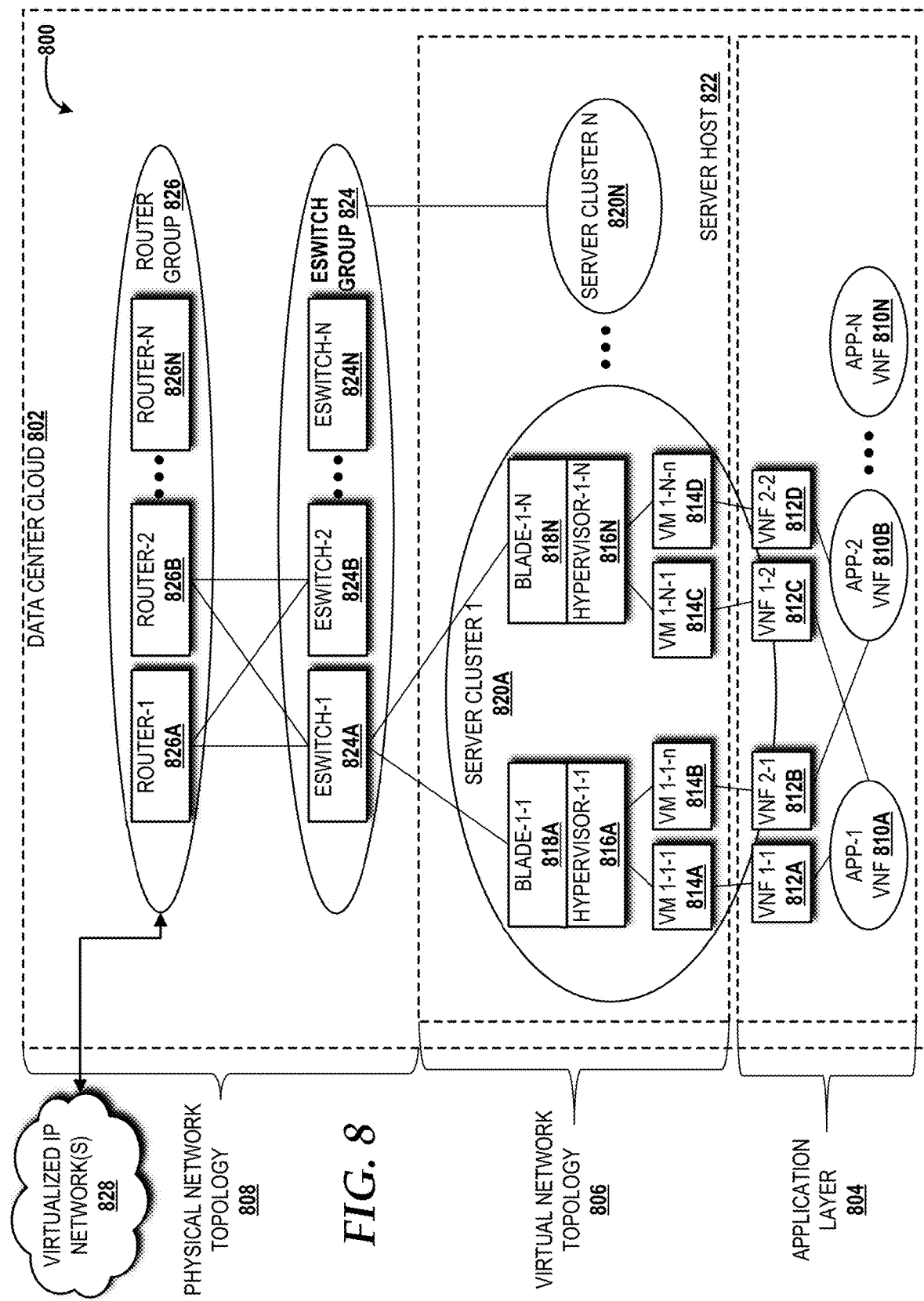
FIG. 8 is a block diagram illustrating an example network topology of a data center cloud capable of implementing aspects of the embodiments disclosed herein.

Turning now to FIG. 8, a network topology 800 for a data center cloud 802 will be described, according to an illustrative embodiment. In some embodiments, the data centers 106 can be configured similar to or the same as in the network topology 800 for the data center cloud 802. The illustrated network topology 800 includes three layers: an application ("APP") layer 804, a virtual network topology layer 806, and a physical network topology layer 808. The APP layer 804 can include one or more application VNFs 810A-810N, each of which can be divided to one or more sub-VNFs 812 to be executed by one or more VMs 814.

The virtual network topology layer 806 includes the VMs 814, one or more hypervisors 816, and one or more server modules ("blades") 818. Each blade 818 can support one hypervisor 816 that, in turn, can manage one or more of the VMs 814. The blades 818 provide computing capacity to support the VMs 814 carrying the VNFs 812. The hypervisors 816 provide resource management among the VMs 814 supported thereby. A logical server cluster 820 is created for resource allocation and reallocation purpose, which includes the blades 818 in the same server host 822. Each server host 822 includes one or more of the server clusters 820.

The physical network topology layer 808 includes an Ethernet switch ("ESwitch") group 824 and a router group 826. The ESwitch group 824 provides traffic switching function among the blades 818. The router group 826 provides connectivity for traffic routing between the data center cloud 802 and virtualized IP network(s) 828. The router group 826 may or may not provide multiplexing functions, depending upon network design.

The virtual network topology 806 is dynamic by nature, and as such, the VMs 814 can be moved among the blades 818 as needed. The physical network topology 808 is more static, and as such, no dynamic resource allocation is involved in this layer. Through such a network topology configuration, the association among application VNFs 810, the VMs 814 supporting the application VNFs 810, and the blades 818 that host the VMs 814 can be determined.

In the illustrated example, a first VNF is divided into two sub-VNFs, VNF 1-1 812A and VNF 1-2 812C, which is executed by VM 1-1-1 814A and VM 1-N-1 814C, respectively. The VM 1-1-1 814A is hosted by the blade 1-1 818A and managed by the hypervisor 1-1 816A in the server cluster 1 820A of the server host 822. Traffic switching between the blade 1-1 818A and the blade 1-N 818N is performed via ESwitch-1 824A. Traffic communications between the ESwitch group 824 and the virtualized IP network(s) 828 are performed via the router group 826. In this example, the VM 1-1-1 814A can be moved from the blade 1-1 818A to the blade 1-N 818N for VM live migration if the blade 1-1 818A is detected to have difficulty to support the VNF 1-1 812A performance requirements and the blade 1-N 818N has sufficient capacity and is available to support the VNF 1-1 812A performance requirements. The virtual network topology 806 is dynamic by nature due to real-time resource allocation/reallocation capability of cloud SDN. The association of application, VM, and blade host in this example is the VNF 1-1 812A is executed on the VM 1-1-1 814A hosted by the blade 1-1 818A in the server cluster 1 820A.

Based on the foregoing, it should be appreciated that concepts and technologies directed to quantum security enhancement for IPsec protocol have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:
1. A method comprising:
   finding, by a quantum resource manager executed by a processor, a recommended quantum routing path for routing data from a first data center to a second data center via a pair of entangled quantum particles, wherein finding, by the quantum resource manager, the recommended quantum routing path for routing the data from the first data center to the second data center via the pair of entangled quantum particles comprises finding, by the quantum resource manager, the recom- mended quantum routing path for routing the data from the first data center to the second data center via the pair of entangled quantum particles responsive to an issue detected with an IPsec encrypted tunnel previously established between the first data center and the second data center;

instructing, by the quantum resource manager, a first quantum node associated with the first data center and a second quantum node associated with the second data center to establish a quantum channel that facilitates the recommended quantum routing path; and preparing, by the quantum resource manager, the IPsec encrypted tunnel to carry a measurement result of an interaction of a qubit of one quantum particle in the pair of entangled quantum particles from the first data center to the second data center.

2. The method of claim 1, wherein finding, by the quantum resource manager, the recommended quantum routing path for routing the data from the first data center to the second data center via the pair of entangled quantum particles further comprises finding, by the quantum resource manager, the recommended quantum routing path for routing the data from the first data center to the second data center via the pair of entangled quantum particles in accordance with a rule.

3. The method of claim 2, wherein the rule specifies that the quantum channel is to be established over a fiber optic network.

4. The method of claim 2, wherein the rule specifies that the quantum channel is to be established over a satellite system.

5. The method of claim 2, further comprising combining, by the quantum resource manager, the IPsec encrypted tunnel and the quantum channel at a first endpoint associated with the first data center and a second endpoint associated with the second data center;

and wherein preparing, by the quantum resource manager, the IPsec encrypted tunnel to carry the measurement result of the interaction of the qubit of one quantum particle in the pair of entangled quantum particles from the first data center to the second data center comprises instructing, by the quantum resource manager, the first endpoint to enable a quantum security treatment flag in a quantum security enhanced authentication header for each IPsec packet to be sent to the second endpoint.

6. The method of claim 5, further comprising:

conducting, between the first quantum node at the first endpoint and the second quantum node at the second endpoint, a quantum communications session over the quantum channel, wherein conducting the quantum communications session comprises teleporting the data in the pair of entangled quantum particles from the first quantum node to the second quantum node; and conducting, between the first endpoint and the second endpoint, a classical communications session over the IPsec encrypted tunnel, wherein conducting the classical communications session comprises sending the measurement result from the first endpoint to the second endpoint.

7. A system comprising:

a quantum resource manager comprising a processor and a memory, wherein the memory stores instructions that, when executed by the processor, cause the processor to perform operations comprising finding a recommended quantum routing path for routing data from a first data center to a second data center via a pair of entangled quantum particles, wherein finding the recommended quantum routing path for routing the data from the first data center to the second data center via the pair of entangled quantum particles comprises finding the recommended quantum routing path for routing the data from the first data center to the second data center via the pair of entangled quantum particles responsive to an issue detected with an IPsec encrypted tunnel previously established between the first data center and the second data center, instructing a first quantum node associated with the first data center and a second quantum node associated with the second data center to establish a quantum channel that facilitates the recommended quantum routing path, and preparing the IPsec encrypted tunnel to carry a measurement result of an interaction of a qubit of one quantum particle in the pair of entangled quantum particles from the first data center to the second data center.

8. The system of claim 7, wherein finding the recommended quantum routing path for routing the data from the first data center to the second data center via the pair of entangled quantum particles further comprises finding the recommended quantum routing path for routing the data from the first data center to the second data center via the pair of entangled quantum particles in accordance with a rule.

9. The system of claim 8, wherein the rule specifies that the quantum channel is to be established over a fiber optic network.

10. The system of claim 8, wherein the rule specifies that the quantum channel is to be established over a satellite system.

11. The system of claim 8, wherein the operations further comprise combining the IPsec encrypted tunnel and the quantum channel at a first endpoint associated with the first data center and a second endpoint associated with the second data center; and wherein preparing the IPsec encrypted tunnel to carry the measurement result of the interaction of the qubit of one quantum particle in the pair of entangled quantum particles from the first data center to the second data center comprises instructing the first endpoint to enable a quantum security treatment flag in a quantum security enhanced authentication header for each IPsec packet to be sent to the second endpoint.

12. The system of claim 11, further comprising the first quantum node, the second quantum node, the first endpoint, and the second endpoint; and wherein the operations further comprise:

conducting, between the first quantum node at the first endpoint and the second quantum node at the second endpoint, a quantum communications session over the quantum channel, wherein conducting the quantum communications session comprises teleporting the data in the pair of entangled quantum particles from the first quantum node to the second quantum node; and conducting, between the first endpoint and the second endpoint, a classical communications session over the IPsec encrypted tunnel, wherein conducting the classical communications session comprises sending a measurement state from the first endpoint to the second endpoint.

13. A computer-readable storage medium comprising computer-executable instructions that, when executed by a processor, cause the processor to perform operations comprising:

finding a recommended quantum routing path for routing data from a first data center to a second data center via a pair of entangled quantum particles, wherein finding the recommended quantum routing path for routing the data from the first data center to the second data center via the pair of entangled quantum particles comprises finding the recommended quantum routing path for routing the data from the first data center to the second data center via the pair of entangled quantum particles responsive to an issue detected with an IPsec encrypted tunnel previously established between the first data center and the second data center;

instructing a first quantum node associated with the first data center and a second quantum node associated with the second data center to establish a quantum channel that facilitates the recommended quantum routing path; and preparing the IPsec encrypted tunnel to carry a measurement result of an interaction of a qubit of one quantum particle in the pair of entangled quantum particles from the first data center to the second data center.

14. The computer-readable storage medium of claim 13, wherein finding the recommended quantum routing path for routing the data from the first data center to the second data center via the pair of entangled quantum particles further comprises finding the recommended quantum routing path for routing the data from the first data center to the second data center via the pair of entangled quantum particles in accordance with a rule.

15. The computer-readable storage medium of claim 14, wherein the rule specifies that the quantum channel is to be established over a fiber optic network.

16. The computer-readable storage medium of claim 14, wherein the rule specifies that the quantum channel is to be established over a satellite system.

17. The computer-readable storage medium of claim 14, wherein the operations further comprise combining the IPsec encrypted tunnel and the quantum channel at a first endpoint associated with the first data center and a second endpoint associated with the second data center; and wherein preparing the IPsec encrypted tunnel to carry the measurement result of the interaction of the qubit of one quantum particle in the pair of entangled quantum particles from the first data center to the second data center comprises instructing the first endpoint to enable a quantum security treatment flag in a quantum security enhanced authentication header for each IPsec packet to be sent to the second endpoint.

* * * * *